July 12, 1966

G. C. VAN DE MEERENDONK 3,259,929

NUT TRANSFER MECHANISM IN MACHINE FOR
MAKING NUTS AND SIMILAR ARTICLES

Filed Dec. 11, 1963

INVENTOR
Gerardus C. van de Meerendonk
BY
Pennie, Edmonds, Morton, Taylor & Adams
ATTORNEYS United States Patent Office 3,259,929
Patented July 12, 1966

3,259,929
NUT TRANSFER MECHANISM IN MACHINE FOR MAKING NUTS AND SIMILAR ARTICLES
Gerardus C. van de Meerendonk, Helmond, Netherlands, assignor to Nedschroef Octrooi Maatschappij N.V., Helmond, Netherlands, a limited-liability company of the Netherlands
Filed Dec. 11, 1963, Ser. No. 329,846
Claims priority, application Netherlands, Feb. 26, 1963, 289,439
10 Claims. (Cl. 10—76)

The present invention relates to improvements in machines for making nuts, bolts and similar articles, of the type including a number of spaced die matrices fronting in a single surface such as that of the frame or die block of the machine, a number of punching members movable toward and away from the die matrices for acting on blanks or workpieces which are subjected to a series of treatments in the die matrices, and transfer finger members cooperating with the die matrices and the punching members for transferring the blanks or workpieces from one die matrix to the next, the transfer fingers being provided with cavities in which the blanks or workpieces fit and being rotatably mounted in a slide carried by a support pivoted to the frame of the machine, said fingers being rotatable through 180° in both directions as they are moved respectively from one die matrix to the next and back again, while said pivoted support carrying the slide and transfer fingers is moved periodically against the action of a spring, during the movement of the slide, to swing the fingers away from the front of the dies, so that they are readily rotatable.

Machines similar to those of the above-described type are known but their transfer mechanisms take up considerable room, and the force which can be exerted on the pivoted support by the spring is small and insufficient for effective, reliable continuous operation. Furthermore, no easy or simple way has been provided for putting the spring out of operation to facilitate repairs and adjustments. Therefore, it is an object of the present invention to provide a machine which will be free of the disadvantages mentioned above and which will give effective and reliable continuous operation.

In a machine according to the invention, the transfer fingers for transferrring the blanks or workpieces are rotatably mounted on a slide carried by a bridge support, pivoted or hinged with respect to the frame of the machine and biased by means of a torsion bar extending along the pivot axis of the support, one end of the torsion bar being fixed with respect to the bridge support, while the other end is connected with the frame of the machine through a special type of coupling and adjusting mechanism. Means is also provided for pivoting or rocking the bridge support upwardly in timed relation with the operation of the machine to permit rotation of the transfer fingers carried thereby.

The machine, including other features and advantages, is described more in detail hereinafter in connection with a single embodiment thereof illustrated diagrammatically in the accompanying drawings, in which.

Figure 1:
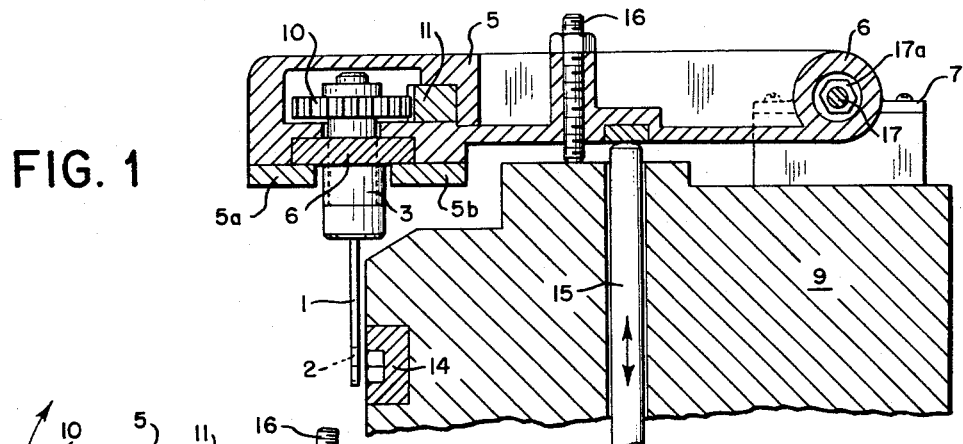
FIG. 1 is a broken elevational view of a part of the machine according to the invention in which parts of the transfer mechanism are shown in vertical section taken on the line 1—1 of FIG. 3, and the transfer fingers are shown in one operative position.
Figure 1A:
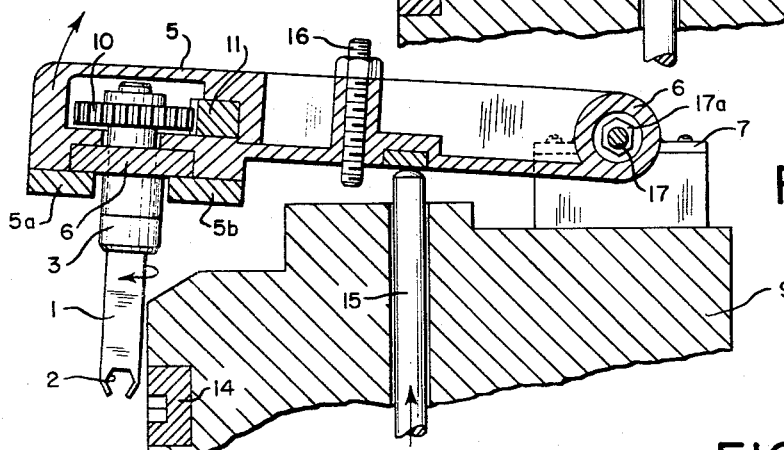
FIG. 1A is a view similar to that of FIG. 1 showing the bridge support and fingers in another operative position.
Figure 2:
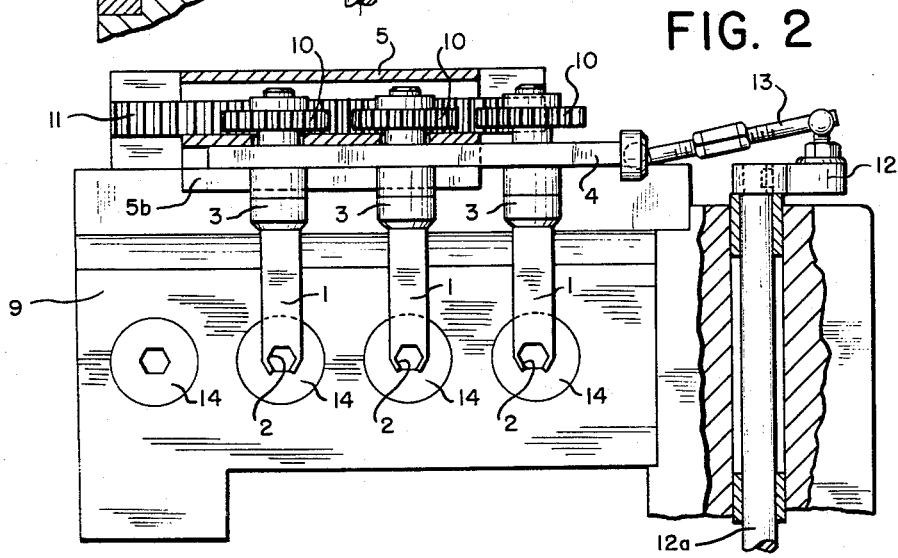
FIG. 2 is a broken elevational view taken in front of the transfer mechanism as shown in FIGS. 1 and 3 with parts broken away.

The features of the machine with which the present invention is primarily concerned are the transfer mechanisms, and more particularly the bridge support and associated parts. As shown in FIGS. 1 and 2, the transfer mechanisms include a plurality of similar finger-like members 1 each provided with a cavity 2 for holding the article to be treated, such as a nut. The cavities 2 are indicated as hexagonal, for holding a hexagonal nut or the like, but they may be of other shape. Each finger-like member 1 is carried on a shaft 3 which is rotatably mounted in a carrier slide 4, arranged for to and fro movement in a bridge member or support 5.

Figure 3:
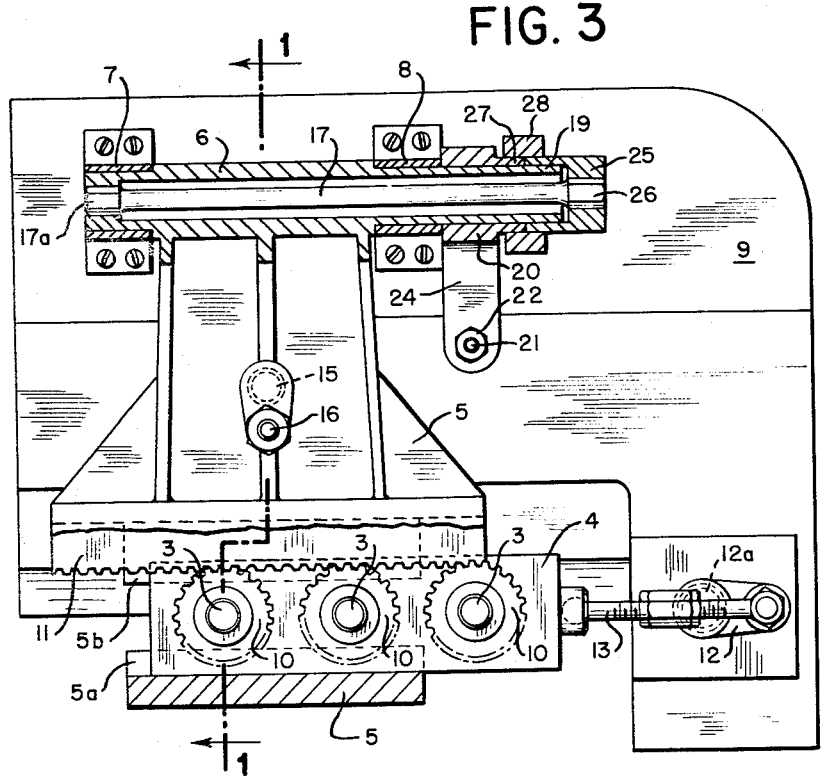
FIG. 3 is a top view of the parts of the machine shown in FIGS. 1 and 2 partly in horizontal section.

The bridge member or support 5 includes a tubular sleeve 6 at its edge remote from the transfer slide 4, projecting portions of which are respectively mounted in spaced bearing units 7 and 8 fixed with respect to the frame 9 of the machine, as shown in FIGS. 1 and 3. A toothed wheel or pinion 10 is fixed to the upper portion of each shaft 3 above the carrier slide 4, the teeth of which engage or mesh with the teeth of a rack 11 fixed to the bridge support 5, as shown in FIGS. 1 to 3.

The carrier slide 4 is supported in the head of the support 5 on spaced wear plates 5a and 5b attached to the support, and is reciprocated by a crank arm 12 mounted on the end of a driving shaft 12a, the crank arm 12 being connected by an adjustable driving rod 13 with one end of the carrier slide 4, as illustrated in FIGS. 2 and 3. When the carrier slide 4 is moved to and fro or reciprocated, each finger member 1 is moved to the left during a forward stroke from the die matrix 14 to the next while simultaneously rotated through 180° in one direction so that the workpiece carried thereby is faced in the opposite direction, and then moved to the right through a backward stroke and simultaneously rotated through 180° in the opposite direction. The rotation of the finger members 1 is effected by the rolling of the pinions 10 on the toothed rack 11.

The foregoing describes only a part of the motions of the finger transfer members. Since they are relatively thin, flat members and mounted with their flat sides closely adjacent to the matrices 14 and the face of the die block the finger members 1 must be moved away from the face of the die block in order to be rotated during the reciprocation of the carrier slide 4. This is accomplished by means of a push rod 15, shown in FIGS. 1 and 3, which is operated in timed relationship with the carrier slide to pivot the bridge support 5 upwardly on the pivot axis of the sleeve 6. The position of the fingers 1 and of the bridge support 5 with respect to the frame 9, when the slide is at rest, is determined by means of an adjusting bolt 16, the lower end of which bears against the frame 9 adjacent to the push rod 15.

The bridge support 5 is biased to the position shown in FIG. 1 and, in this position, during the operation of the machine, the workpieces in the die matrices 14 are pushed simultaneously into the cavities 2 of the finger members 3. Now, just as the slide 4 is about to be moved to the left in FIG. 2, the push rod 15 is actuated to tilt the bridge support to the position shown in FIG. 2A so that the flat finger-like members 1 are moved away from the die block sufficiently to permit their rotation through 180°. As soon as the rotation is complete the finger members 1 have been moved one die matrix to the left in FIG. 2 and returned to the position shown in FIG. 1 where the workpieces are forced by the punches (not shown) into the die matrices 14, in accordance with the usual procedure. As the slide 4 is about to move the finger members back to the right and rotate them through 180°, to receive workpieces, they will be again swung up and out by the push rod 15 during the rotation and translation.

The biasing means for bringing back the bridge support 5 to its rest position determined by the bolt 16 after it has been swung upwardly by the push rod 15, and pivoted in the bearings 7 and 8, comprises a spring in the form of a torsion bar 17 mounted in the sleeve 6 in the manner shown in FIG. 3. One end 17a of the torsion bar 17 is fixedly connected with a part of the bridge support 5, as for example within the bearing 7 at the end of sleeve 6 by a hexagonal connection, while the other end is connected with the frame 9 of the machine by an intermediate connecting mechanism, for example by an annular coupling member 28, as shown in FIGS. 3 to 6.

The structure involved in this mechanism includes an extension 19, of the tubular sleeve 6 of the bridge support 5, extending to the right of the bearing 8. An adjusting piece 20 having a lever arm 24 is arranged over the extension tube 19 with the arm 24 connected to the frame 9 by means of a threaded bolt 21 having one end threaded into the frame and provided with adjusting nuts 22 and 23 on opposite sides of the arm 24. A tubular lengthening piece 25 is positioned freely rotatable on the end of the tubular extension 19, in which the end 26 of the torsion bar 17 is fixed, as shown in FIGS. 3 to 6, the ends of the bar 17 being hexagonal and fitting respectively in hexagonal openings in elements 6 and 25. The extension tube 25 is angularly shaped outside. For example it is illustrated as having a hexagonal exterior and comprises a hexagonal nut. The adjusting piece 20 includes a sleeve extension 27 having an exterior shape like the tubular member 25 which it abuts within a ring-shaped coupling sleeve 28. The coupling member 28, which has an interior angular shape like the exteriors of the tube 25 and extension 27, for example hexagonal, so that it fits them but can be shifted to and fro over the angular-shaped outer surfaces of the extension tube 25 and projecting end 27 of the adjusting piece 20.

With the coupling ring 28 the extension tube 25 may be coupled to the adjusting piece 20 fixed to the frame, and the coupling ring may be removed by shifting it along over the extension tube 25, that is, to the right in FIG. 3, which would uncouple the torsion bar 17, so that it would apply no bias to the bridge support 5. When the torsion bar spring 17 is under tension, the shifting of the coupling ring 25 off the sleeve 27 is, of course, difficult, and the same is true when it is desired to effect a coupling of the tubular extension 25 with the adjusting member 20 with the bar 17 under tension. When the coupling ring 28 is only on the extension 25, a spanner or wrench can be put on its hexagonal outside at the end and the extension 25 rotated to provide the necessary tension to be given to the torsion bar spring 17, for when the extension 25 is turned counterclockwise in FIGS. 4 and 5, the bar 17 will also rotate or be twisted since its left hand is fixed with respect to the sleeve 6 of the bridge support 5. The torsion bar spring 17 is, therefore, loaded and the bridge support 5 will be held in its down position under tension. When both the hexagonal exteriors of the extension 25 and sleeve 27 are in line or match, the coupling ring 25 may be shifted to the left in FIG. 6, to the coupling position shown in FIG. 3, so that the adjusting member 20 is rotatably connected with the extension tube 25 and thus with the right-hand end 26 of the torsion bar spring 17. In this structure the extension 19 serves as a bearing for the members 20 and 25 and lever arm 27.

Since the end 26 of the torsion bar spring 17 is fixed against rotation with respect to the frame 9 via the extension tube 25, the coupling ring 28, the adjusting piece 20 with its arm 24 connected to the threaded stud 21, and the other end 17a of the torsion bar spring 17 is fixed with respect to the pivoted bridge support member 5, the lifting of the member 5 by push rod 15 will put the torsion bar 17 under a greater tension than that for which it was set, and consequently return the bridge support member 5 to the position shown in FIG. 1, when the push rod 15 returns to its lowermost position.

Figure 4:
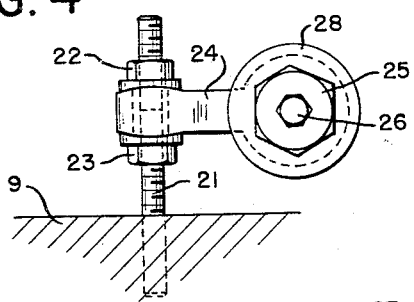
FIGS. 4 and 5 are detail views of two different positions of the adjusting means looking from the right in FIG. 3 toward the end of the coupling means for the torsion bar spring.
Figure 5:
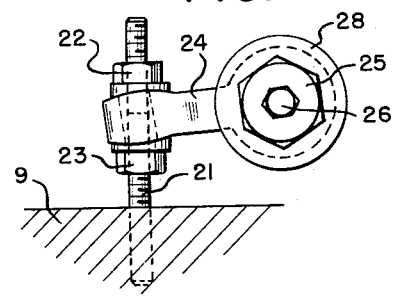
Figure 6:
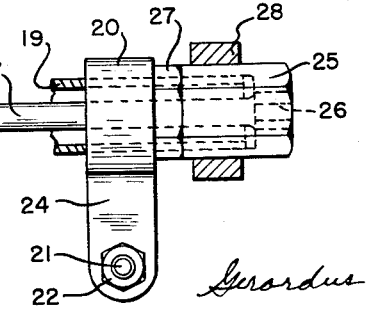
FIG. 6 is a detail view partly in section of the coupling and adjusting means for the torsion bar, taken from above in FIG. 3.

With the construction illustrated, including the threaded stud 21, it is apparent that the tension of the torsion bar spring 17 can be adjusted and controlled by means of the threaded stud 21 by suitable operation of the nuts 22 and 23 thereon, as illustrated in FIGS. 4 and 5. Since the coupling ring 28 has a hexagonal interior, it is not possible with that to make an adjustment smaller than ⅙ of a turn. Smaller or in between adjustments, therefore, may be made by moving the end of the arm 24 up or down along the stud 21 by the operation of the nuts 22 and 23. The bore through the end of the arm 24, as indicated, is somewhat larger than the diameter of the stud 21 and the upper and lower sides of the arms 24 are arcuate and fit complementary shaped washers acted on respectively by the nuts 22 and 23.

If for any reason the movement of the finger members 1 is blocked in front of the respective matrices 14, the tension of the torsion bar spring 17 can be removed or taken away for a moment or longer by placing a spanner or suitable wrench on the hexagonal end portion of the extension tube 25 and rotating it clockwise in FIG. 4 to take the tension off the bar 17. The connecting ring 28 can then be shifted and the bridge support 5 be freely swung upwardly for inspection, adjustment or repairs (after disconnecting drive rod 13).

The die matrices 14 are mounted in line in the die breast of the frame and face along the same plane, while the axis of the bridge support 5, corresponding to the pivot axis of the sleeve 6 is parallel with the line of the die matrices 14, so that the finger members 1 are regularly spaced with respect to the die matrices at their various positions during the movement of the slide and the pivoting of the bridge support.

What is claimed as new is:

1. In a machine for making nuts and other metal articles including a frame provided with a plurality of spaced die matrices located with their faces in a single surface, a transfer mechanism for transferring workpieces from one matrix to the next, said transfer mechanism including a bridge support pivotally mounted on the frame, a carrier slide mounted on the bridge support and a plurality of transfer fingers rotatably mounted on the carrier slide and extending respectively to a position opposite the die matrices for receiving workpieces therefrom, means for moving said carrier slide to and fro and for simultaneously rotating said fingers through 180° in a forward and backward direction, and means for rotating said pivoted bridge support on its pivot axis against the action of a spring for periodically swinging said fingers away from the faces of said die matrices during the rotation of said fingers, the improvement in which the spring for biasing said bridge support comprises a torsion bar under tension located along the pivot axis of the bridge support, means non-rotatably connecting the end portions of the torsion bar respectively with a part of the bridge support and with respect to the frame of the machine, one of said connecting means including a readily engageable and disengageable coupling means.

2. A machine as claimed in claim 1, in which the pivoted bridge support includes a sleeve extending along its pivot axis and mounted in bearings secured to the frame of the machine, said torsion bar being located in said sleeve with one end thereof secured to one end of the sleeve.

3. A machine as claimed in claim 2, in which said coupling means is mounted on the other end of said sleeve and includes means connected with the other end of the torsion bar and with the frame of the machine.

4. A machine as claimed in claim 3, in which separate means are respectively connected to said other end of the torsion bar and the frame of the machine, and in which said separate means are coupled together by a coupling ring.

5. A machine as claimed in claim 1, in which the coupling means includes a member surrounding and non-rotatably connected with said other end of the torsion bar, and adjustable member aligned with said member on said bar and an axially movable coupling ring surrounding and non-rotatably connecting said members.

6. A machine as claimed in claim 5, in which said adjustable member includes a sleeve surrounding said torsion bar and an arm on said sleeve connected to the frame of the machine.

7. A machine as claimed in claim 6, including a means fixed to the frame of the machine and engaging the end of said arm remote from said sleeve for pivoting said arm about the axis of said torsion bar spring and adjusting the tension thereon.

8. A machine as claimed in claim 1, in which the coupling means includes separate means for respectively making a coarse and a fine adjustment of the tension applied to the torsion bar.

9. In a machine for making metal nut blanks or the like comprising a frame, a die bed on the frame provided with a die face having therein a plurality of aligned die stations at which the blanks are progressively processed, the axes of said stations being in a substantially horizontal plane, transfer means for transferring the blanks from one station to another including blank-holding fingers, a slide in which said fingers are mounted to rotate about an axis substantially at the center line of the fingers, means for moving the slide to effect a translatory movement of said fingers across the face of the die bed, means for rotating said fingers about said axis to reverse the blanks carried thereby, means for pivoting said fingers about an axis parallel to and spaced from the line of die stations during said translatory movement and in timed relation to their rotation to move the blank-holding portions of said fingers away from and toward the die face, said means for pivoting the fingers including a torsion bar spring biasing said fingers toward the die face.

10. A machine as claimed in claim 8, including a bridge support on which the slide is mounted, said bridge support comprising a tubular sleeve mounted in bearings fixed to the frame of the machine, said sleeve including an extension beyond one of said bearings and said torsion bar being mounted in said sleeve with one end projecting beyond said extension, the opposite end of said torsion bar being non-rotatably fixed to said sleeve, coupling means mounted on said sleeve extension including an adjustable sleeve located inwardly from the end of said extension and having an arm thereon, the projecting end of which is adjustably locatable with respect to the frame of the machine, a tubular cap member fitting over the end of said sleeve extension and in which the projecting end of said torsion bar is non-rotatably mounted, said adjusting sleeve and said tubular cap member abutting each other and including similarly shaped non-cylindrical external surfaces including flat sections, and a coupling ring having an inner surface structure maching the external surfaces of said adjusting member and cap member, said coupling member being slidable over said cap member to a position engaging and coupling said adjusting and cap members, said cap member being rotatable relative to said adjusting member for applying a tension to said torsion bar prior to sliding said coupling ring along the cap member into engagement with the adjusting member.

References Cited by the Examiner
UNITED STATES PATENTS
2,599,053  6/1952  Friedman _____ 10—12.5
2,728,267  12/1955  Schaeffer et al. _____ 10—12

ANDREW R. JUHASZ, *Primary Examiner.*